April 12, 1955     J. W. WELSH     2,706,228
SNAP ACTION VALVE

Filed Aug. 18, 1953     2 Sheets-Sheet 1

INVENTOR
James W Welsh
BY
ATTORNEY

April 12, 1955     J. W. WELSH     2,706,228
SNAP ACTION VALVE

Filed Aug. 18, 1953     2 Sheets-Sheet 2

INVENTOR
James W Welsh
BY
ATTORNEY

United States Patent Office
2,706,228
Patented Apr. 12, 1955

2,706,228

SNAP ACTION VALVE

James W. Welsh, Summit, N. J., assignor to Signal-Stat Corporation, Brooklyn, N. Y., a corporation of New York Application August 18, 1953, Serial No. 375,035

14 Claims. (Cl. 200—122)

This invention relates to snap action electric switches of the thermostatically operated type and, more particularly, to such a switch having an improved thermostatic operating element.

Thermostatically operated switches generally include a high resistance, expansible electric conductor as part of the contact operating mechanism. This conductor may be caused to expand by connecting it in an electric circuit, and will cool and contract when its energizing circuit is opened or shunted.

The most useful high resistance expansible conductor, from the standpoint of incorporating the desired resistance into the switch energizing circuit, is a very small diameter high resistance wire of a material such as "Nichrome," for example. However, the elastic expansion characteristics of such a wire are such that an additional, or ballast, resistance must frequently be connected in circuit therewith to obtain the necessary total resistance in the operating circuit while keeping the wire itself at a length determined by the operating parameters of the switch.

For example, in a thermostatic switch designed for contact operation with only small changes in the wire length, and in which only a relatively short wire can be effectively used, the wire itself does not have sufficient resistance to provide the desired overall resistance in the operating circuit. Such conditions occur, for example, in a "normally open" flasher where, when a control switch is closed, the current flows only through the operating wire and not through the circuit controlling contacts of the switch. When the operating wire has heated and expanded a pre-set amount, the circuit controlling contacts close a shunt circuit around the operating wire. If the resistance of the operating wire is sufficiently high, substantially no current will flow through the wire when the shunt circuit is closed, so that the wire will contract to reopen the contacts and repeat the cycle. Almost invariably a ballast resistance must be connected in series with the operating wire to obtain a sufficiently high resistance to assure that substantially no current will flow through the wire when it is so shunted.

The foregoing considerations are particularly applicable to thermostatic snap action switches or flashers of the type incorporating a snap action vane, of electrically conductive material, which is snapped between two deformed positions by alternated contraction and expansion of a high resistance wire secured at each end to spaced portions of the vane. To obtain the desired response characteristics, such a vane must be made light weight and of relatively small overall dimensions. Hence, the length of the operating wire is correspondingly limited, which limits the circuit resistance available in the wire. As a result, where the aforementioned high resistance conditions are required, a ballast resistance must be connected in series with the operating wire.

In my co-pending application, Serial No. 374,976, filed August 18, 1953, for "Snap Action Device," I have shown and described a novel snap action vane, of electrically conductive material which may be incorporated in a snap action switch. This vane is provided with an initial bend about a right line extending across the vane by thinning or deforming the vane along this line in two or more spaced sections of the line, these sections being spaced at their inner ends from the center of the vane and also preferably spaced from the outer ends of the bent line. When such a vane is to be utilized in a snap action switch, such as a flasher, the vane is forcibly bent about another line, at an angle to the line of the initial bending by applying force to the ends of such lines of initial bending. When such force is released, the vane snaps back to its initial bent position, the action closely resembling that of a toggle.

Such a vane may be conditioned for use in a thermostatic switch by thus forcibly bending the vane and securing a high resistance wire or strip at each of its ends to the vane at the ends of the line of initial bending. This high resistance wire or strip thus forcibly holds the vane in a distorted position bent about a line angularly related to the line of initial bending. When the high resistance wire has electric current passing therethrough, it heats and expands. During the expansion of the wire, a point is reached at which the tension exerted by the wire is over-balanced by the kinetic energy of the vane stored therein by bending the latter from its initial bent condition. At this point, the vane snaps back to its initially bent condition.

If the vane is then mounted or fixed at a point spaced laterally of the wire of initial deformation, and preferably on an elliptical stress loci band radiating from the vane center, the free portion of the vane will pivot about such fixed mounting point during snapping of the vane. During the snapping movements, the high resistance conductor will be juxtaposed along the vane in the initially deformed or "restored" condition of the vane, and will have at least its intermediate portion spaced from the vane in the stress-deformed condition of the latter. The conductor thus also moves relative to the fixed mounting point of the vane. These movements of the vane and the conductor relative to the fixed mounting point of the vane may be utilized in providing various contact arrangements for switches incorporating such a vane.

However, with this type of vane, as with other vane-incorporating snap action switches, the length of the operating high resistance wire is limited and an additional or ballast resistance must be used where a high resistance operating circuit is required. Such ballast resistance not only increases the cost of the switch but also increases its cost of assembly, operating complexity and liability to malfunction.

In accordance with the present invention the foregoing difficulties are avoided and a compact, reliable thermostatic switch, having the desired operating resistance directly incorporated therein, is provided in a novel manner. More specifically, a separate heat expansible element is attached at each end to the vane to constitute the operating element therefor. The high resistance wire, which is preferably insulated, is operatively associated with the operating element to heat the same when the operator energizing circuit is closed. Thus, the high resistance wire is no longer limited in length by the vane and switch parameters and can be made sufficiently long to incorporate all the desired electrical resistance therein, thereby eliminating the need for an additional ballast resistance where a high resistance circuit, under shunted conditions, is required. Depending upon the contact arrangements desired, the separate heat expansible operating element may or may not be included partially or completely in the switch electrical circuit.

For an understanding of the invention principles, reference is made to the following description of typical embodiments thereof as illustrated in the accompanying drawings.

Figure 1:
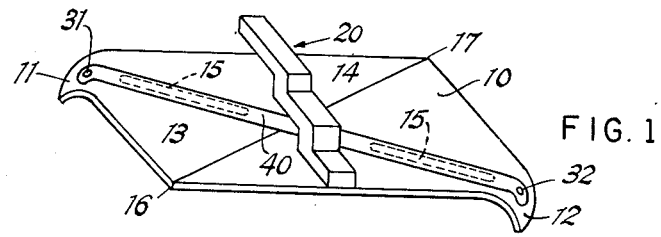
Fig. 1 is a perspective view of a snap action vane and its mounting member as used in the invention switch arrangement.
Figure 10:
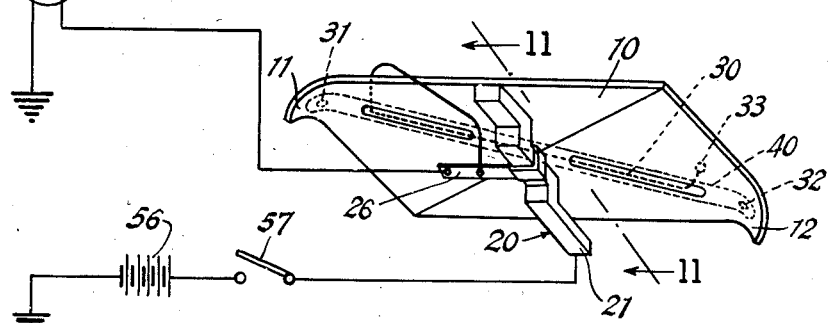
Fig. 10 is a view, similar to Fig. 8 of a normally open snap action switch embodying the invention.

Referring to Fig. 1, which is substantially identical with Fig. 10 of my said co-pending application, Serial No. 374,976, a snap action vane 10 is illustrated which is identical with that shown and described therein. Vane 10 is preferably made of relatively thin spring metal, with consideration being given to its spring factor, stiffness, temperature coefficient, and the like, in accordance with the desired rate of operation of the snap action.

To provide an initial set to vane and to give the same some depth so that it will resemble a beam in its action, the vane 10, which is shown as a substantially rectangular vane, is deformed or thinned along diagonal interconnecting corners 11 and 12. This vane deformation is preferably effected by linearly embossing the vane along the line 11—12 in two elongated spaced portions or bosses 15. It will be noted that the bosses 15 have their inner ends disposed substantially equal distances from the center of the vane so that the center area of the vane is left unmarred. This greatly prolongs the life of vane 10 by removing the stress concentration from the center to a pair of points on bosses 15. If the deformation line 11—12 were continuous through the vane center area, the flattening of the vane at the center during repeated cycles would eventually cause fatigue of the vane at the center and reduce the amount of force required to snap the vane between the illustrated position and another deformed position.

Due to the bosses 15, 15, the sections 13 and 14 of the vane on either side of line 11—12 are bent upwardly so that the vane assumes the form of a shallow vee (V) having its apex on line 11—12. When vane bending forces are applied to the end of line 11—12, and the value of these forces equals or over-balances the inherent tendency of the vane to stay in its preset condition, the vane snaps into a new bent or deformed position, forming another shallow vee (V) along the other diagonal 16—17. When the forces at points 11 and 12 are decreased to a point where they are overbalanced by the kinetic energy stored in vane 10 due to such distorting force, the vane snaps back to a position bent along the line 11—12.

Photographs, taken with polarized light, of a transparent vane formed in this manner show lines of force in the unmarred center area of the vane which comprise elliptical hands having radii centered on the vane center. If the vane is secured or supported at a point on one of these elliptical stress loci, the stress points on the vane during application of bending force at corners 11 and 12 occur within the length of bosses 15. Thus, the stresses are removed from the center area and distributed between two points spaced from the center. This greatly prolongs the period before fatigue takes place in the stressed section of the vane.

Advantage is taken of this fact by electrically and mechanically supporting the vane by securing the latter, at a point on one of such elliptical lines of force, to a relatively rigid electrically conductive mounting member or bracket 20. The point of attachment of the mounting member to the vane acts as a pivot point for the vane during its snap action, and is preferably spaced laterally of the initial bend line 11—12.

When the vane is used to form a snap action switch, the bending stresses may be conveniently applied to points 11 and 12 by means of a heat expansible element secured to these corners of the vane. For this purpose, the points 11 and 12 are bent downwardly as illustrated in Fig. 1, and the ends of the element are secured thereto at 31 and 32, while the vane is bent along the line 16—17, so that the element in its cold or contracted position, holds the vane deformed into a vee (V) having its apex along lines 16 and 17. If the element is heated, it expands and, as the wire force is overbalanced by the restoring kinetic energy built up in vane 10, the vane snaps back to its initially bent condition along the line 11—12.

In accordance with the invention, an indirectly heated, heat expansible element 40, preferably of conductive metal, is secured, in contracted relation, to the corners 11 and 12 of vane 10, as at the points 31, 32. Such securement may be, for example, by soldering or spot welding the ends of element 40 to vane 10 at points 31, 32 and is effected while the vane is stress-deformed about the diagonal 16—17. Thereby, when element 40 is heated and expanded a predetermined amount, the kinetic energy in vane 10 will overbalance the tension of element 40 and snaps the vane to its restored position in which it is bent about the diagonal 11—12.

Figure 3:
Fig. 3 is a plan view corresponding to Fig. 2.
Figure 4:
Fig. 4 is a transverse sectional view on the line 4—4 of Fig. 3.
Figure 2:
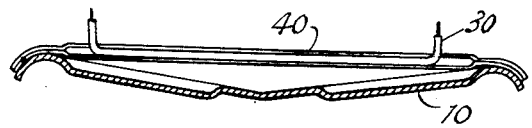
Fig. 2 is a transverse sectional view of the vane of Fig. 1 with the invention operator and its heating means secured thereto.

The indirect heating is effected by operatively associating a preferably insulated high resistance wire 30 with element 40. The length of the wire 30 is independent of the length of element 40 and the parameters of vane 10, and is conditioned solely by the amount of resistance it is necessary or desirable to include in the heating circuit for the vane operator. In the embodiment of Figs. 2, 3 and 4, element 40 is a channel shaped strip having resistance wire 30 extending therethrough and with its end brought out of the channel at selected points in accordance with the desired switch contact and circuit arrangements.

Figure 5:
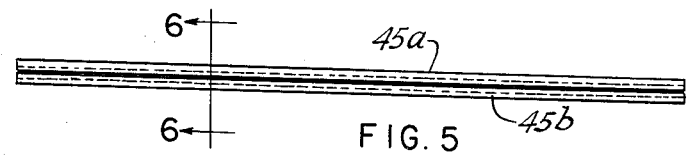
Fig. 5 is a longitudinal elevation view of another form of indirectly heated vane operator.
Figure 6:
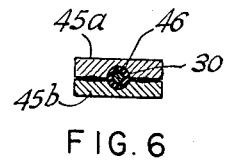
Fig. 6 is a transverse sectional view on the line 6—6 of Fig. 5.

Figs. 5 and 6 show an alternative arrangement in which the "pull strip" secured to vane corners 11 and 12 comprises a pair of mating strips or ribbons 45a, 45b each having a central groove 46 therealong. An insulated high resistance wire 30 is enclosed in grooves 46 and strips 45a, 45b are then welded together to form a composite "pull ribbon" 45.

Figure 7:
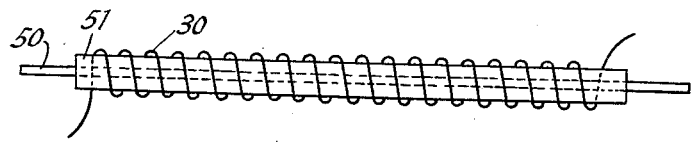
Fig. 7 is an elevation view of still another form of operator embodying the invention.

A third embodiment of the indirectly heated pull strip arrangement is shown in Fig. 7. In this instance, the pull strip is an expansible wire 50 having a dielectric sleeve 51 thereon. High resistance wire 30 which, in this instance, may be bare, is wound helically on sleeve 51.

Figure 8:
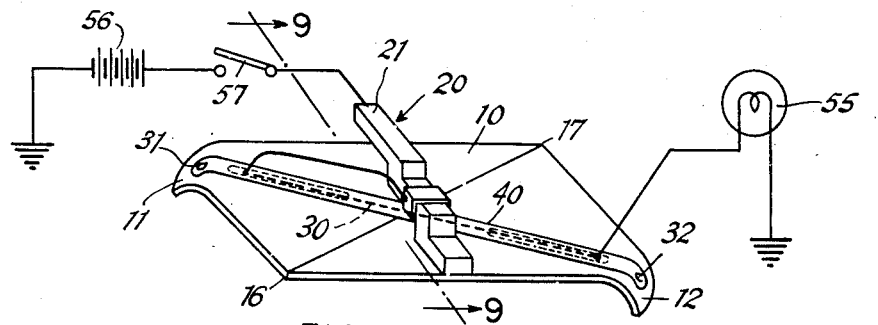
Fig. 8 is a perspective view of a normally closed snap action switch embodying the invention, schematically indicating the external circuit connections.
Figure 9:
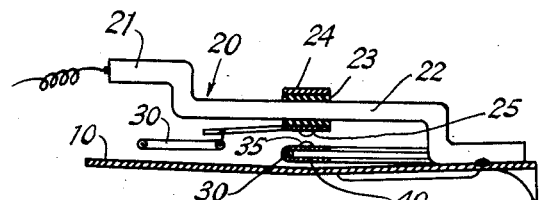
Fig. 9 is a sectional view on the line 9—9 of Fig. 8.

Figs. 8 and 9 show a normally closed flasher or electric switch embodying the pull strip or ribbon 40 of Figs. 2, 3, and 4. This is by way of example only, as the pull strips 45, of Figs. 5 and 6, or 50, of Fig. 7, could equally well be used.

Referring to Figs. 8 and 9, bracket 20 has one end secured to the same surface of vane 10 as has the strip 40 therealong. The central or intermediate sections 22 of bracket 20 carries a dielectric wrapping 23 around which is a conductive band 24 carrying a contact 25 facing electrically conductive strip 40. The latter has secured thereto a contact 35 engaged with contact 25 in the stress-deformed condition of vane 10 with strip 40 contracted.

High resistance wire 30 has one end connected to band 24, and thus to contact 25, and its other end to a grounded lamp 55. A grounded battery 56 is connected, through a control switch 57 to the end 21 of bracket 20.

In the position of the parts shown, when switch 57 is closed, current flows from battery 56 through switch 57, bracket 20, vane 10, strip 40 from both ends thereof, contact 35, contact 25, band 24 and lamp 55 to ground. The current flow through wire 30 rapidly heats the latter to a high temperature, thus heating the embracing channel strip 40. The resistance of the latter is so small that the heating effect of current flowing therethrough is negligible. As strip 40 is heated by wire 30, it expands and, after pre-set expansion thereof, vane 10 is released to snap to its restored position. As strip 40 is thus pulled toward vane 10 and away from bracket 20, contacts 25, 35 are snapped open, breaking the energizing circuit for wire 30. The latter and strip 40 now cool. As strip 40 contracts towards its illustrated position, vane 10 is snapped to the stress-deformed condition, closing contacts 25, 35 to repeat the cycle.

Figure 11:
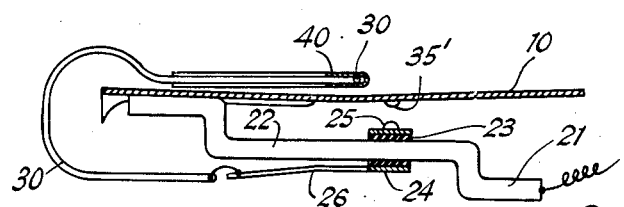
Fig. 11 is a sectional view on the line 11—11 of Fig. 10.

Figs. 10 and 11 illustrate a normally open switch or flasher incorporating the indirectly heated pull strip of the invention. In this instance, bracket 20 is secured to the surface of vane 10 opposite to that having pull strip 40 lying therealong. The surface secured to bracket 20 carries a contact 35' located on the opposite side of diagonal 11—12 from the vane mounting point and preferably on all elliptical stress loci band.

Wire 30 has one end secured to vane 10, as at point 33, by soldering or welding. The opposite end of wire 30 is soldered or welded to a conductive strip 26 extending from band 24. The latter carries contact 25 cooperable with contact 35', the contacts being separated in the illustrated stress deformed condition of vane 10. Grounded lamp 55 is connected to strip 26, and grounded battery 56 is connected to end 21 of bracket 20 through control switch 57.

When switch 57 is closed, current flows from battery 56 through switch 57, bracket 20, vane 10, point 33, wire 30, strip 26, and lamp 55 to ground. As wire 30 is rapidly heated, it heats strip or element 40 which expands to allow vane 10 to snap to its restored position. Contacts 25, 35' are closed, so that current flows from vane 10 through contacts 35', 25, strip 26 and lamp 55 to ground, shunting wire 30. The latter is chosen long enough to have sufficient resistance that, when shunted by contacts 25, 35' substantially no current will flow therethrough. Thus wire 30 and strip 40 will cool and, as strip 40 contracts, it will snap vane 10 to the illustrated position, opening contacts 25, 35' to remove the shunt from wire 30. The cycle then repeats.

The pull element arrangement thus eliminates the necessity for a ballast resistance by making the heater wire length independent of the vane parameters so that all resistance can be incorporated in the heater wire 30.

While a specific embodiment of the invention has been shown and described in detail to illustrate the application of the invention principles, it will be understood that the invention may be embodied otherwise without departing from such principles.

What is claimed is:

1. A snap action electric switch comprising, in combination, a substantially flat vane of electrically conductive resilient material having a substantially linear preset deformation extending thereacross, said deformation being interrupted intermediate its ends at points substantially equidistant from the vane center to leave the central area of the vane free of preset deformation; electrically conductive means electrically and mechanically secured to and mounting said vane at a point spaced laterally from said deformation whereby, under bending stresses periodically applied to and released from points adjacent the outer ends of said deformation to effect snapping of the vane between a bending-stress-deformed position and a restored initial preset position, the free portion of the vane will pivot about such mounting point; a heat expansible element having its opposite ends secured to said vane at points adjacent the outer ends of said deformation and, in its cool and contracted condition, holding said vane in the stress-deformed condition in which the vane is bent about a line intersecting said deformation at an angle of substantially 90°; a first contact electrically and mechanically secured to the free portion of the vane; a second contact fixed relative to the vane mounting point; said contacts being engaged in one position of the free portion of the vane and disengaged in the other position thereof; a high resistance electric conductor arranged in heat transfer relation to said element; and means operable to connect a source of electric potential across said conductor at intermittent intervals to heat and expand said element, followed by cooling and contraction thereof, to effect snapping of the vane between its two positions to operate said contacts.

2. A snap action electric switch comprising, in combination, a substantially flat vane of electrically conductive resilient material having a substantially linear preset deformation extending thereacross, said deformation being interrupted intermediate its ends at points substantially equidistant from the vane center to leave the central area of the vane free to preset deformation; electrically conductive means electrically and mechanically secured to and mounting said vane at a point spaced laterally from said deformation whereby, under bending stresses periodically applied to and released from points adjacent the outer ends of said deformation to effect snapping of the vane between a bending-stress-deformed position and a restored initial preset position, the free portion of the vane will pivot about such mounting point; a heat expansible element having its opposite ends secured to said vane at points adjacent the outer ends of said deformation and, in its cool and contracted condition, holding said vane in the stress-deformed condition in which the vane is bent about a line intersecting said deformation at an angle of substantially 90°; a first contact electrically and mechanically secured to the free portion of the vane; a second contact fixed relative to the vane mounting point; said contacts being engaged in one position of the free portion of the vane and disengaged in the other position thereof; a high resistance electric conductor arranged in heat transfer relation to said element; and means, including said contacts, operable to connect a source of electric potential across said conductor at intermittent intervals to heat and expand said element, followed by cooling and contraction thereof, to effect snapping of the vane between its two positions to operate said contacts.

3. A snap action electric switch comprising, in combination, a substantially flat vane of electrically conductive resilient material having a substantially linear preset deformation extending thereacross, said deformation being interrupted intermediate its ends at points substantially equidistant from the vane center to leave the central area of the vane free of preset deformation; an electrically conductive member electrically and mechanically secured to and mounting said vane at a point spaced laterally from said deformation whereby, under bending stresses periodically applied to and released from points adjacent the outer ends of said deformation to effect snapping of the vane between a bending-stress-deformed position and a restored initial preset position, the free portion of the vane will pivot about such mounting point; a heat expansible element having its opposite ends secured to said vane at points adjacent the outer ends of said deformation and, in its cool and contracted condition, holding said vane in the stress-deformed condition in which the vane is bent about a line intersecting said deformation at an angle of substantially 90°; a first contact electrically and mechanically secured to the free portion of the vane; a second contact electrically and mechanically secured to said member; said contacts being engaged in one position of the free portion of the vane and disengaged in the other position thereof; a high resistance electric conductor arranged in heat transfer relation to said element; and means operable to connect a source of electric potential across said conductor at intermittent intervals to heat and expand said element, followed by cooling and contraction thereof, to effect snapping of the vane between its two positions to operate said contacts.

4. A snap action electric switch comprising, in combination, a substantially flat vane of electrically conductive resilient material having a substantially linear preset deformation extending thereacross, said deformation being interrupted intermediate its ends at points substantially equidistant from the vane center to leave the central area of the vane free of preset deformation; an electrically conductive member electrically and mechanically secured to and mounting said vane at a point spaced laterally from said deformation whereby, under bending stresses periodically applied to and released from points adjacent the outer ends of said deformation to effect snapping of the vane between a bending-stress-deformed position and a restored initial preset position, the free portion of the vane will pivot about such mounting point; a heat expansible element having its opposite ends secured to said vane at points adjacent the outer ends of said deformation and, in its cool and contracted condition, holding said vane in the stress-deformed condition in which the vane is bent about a line intersecting said deformation at an angle of substantially 90°; a first contact electrically and mechanically secured to the free portion of the vane; a second contact electrically and mechanically secured to said member; said contacts being engaged in one position of the free portion of the vane and disengaged in the other position thereof; a high resistance electric conductor arranged in heat transfer relation to said element; and means, including said contacts, operable to connect a source of electric potential across said conductor at intermittent intervals to heat and expand said element, followed by cooling and contraction thereof, to effect snapping of the vane between its two positions to operate said contacts.

5. A snap action electric switch comprising, in combination, a substantially flat vane of electrically conductive resilient material having a substantially linear preset deformation extending thereacross, said deformation being interrupted intermediate its ends at points substantially equidistant from the vane center to leave the central area of the vane free of preset deformation; an electrically conductive member mounting said vane at a point spaced laterally from said deformation whereby, under bending stresses periodically applied to and released from points adjacent the outer ends of said deformation to effect snapping of the vane between a bending-stress-deformed position and a restored initial preset position, the free portion of the vane will pivot about such mounting point; a heat expansible element having its opposite ends secured to said vane at points adjacent the outer ends of said deformation and, in its cool and contracted condition, holding said vane in the stress-deformed condition in which the vane is bent about a line intersecting said deformation at an angle of substantially 90°; a first contact carried by the free portion of the vane; a second contact mounted on said member; said contacts being engaged in one position of the free portion of the vane and disengaged in the other position thereof; a high resistance electric conductor arranged in heat transfer relation to said element; and means, including said contacts, said vane, and said member, operable to connect a source of electric potential across said conductor at intermittent intervals to heat and expand said element, followed by cooling and contraction thereof, to effect snapping of the vane between its two positions to operate said contacts.

6. A snap action electric switch comprising, in combination, a substantially flat vane of electrically conductive resilient material having a substantially linear preset deformation extending thereacross, said deformation being interrupted intermediate its ends at points substantially equidistant from the vane center to leave the central area of the vane free of preset deformation, an electrically conductive member mounting said vane at a point spaced laterally from said deformation whereby, under bending stresses periodically applied to and released from points adjacent the outer ends of said deformation to effect snapping of the vane between a bending-stress-deformed position and a restored initial preset position, the free portion of the vane will pivot about such mounting point; a heat expansible element having its opposite ends secured to said vane at points adjacent the outer ends of said deformation and, in its cool and contracted condition, holding said vane in the stress-deformed condition in which the vane is bent about a line intersecting said deformation at an angle of substantially 90°; a first contact carried by the free portion of the vane; a second contact mounted on said member in insulated relation thereto; said contacts being engaged in one position of the free portion of the vane and disengaged in the other position thereof; a high resistance electric conductor arranged in heat transfer relation to said element; and means, including said contacts, said vane, and said member, operable to connect a source of electric potential across said conductor at intermittent intervals to heat and expand said element, followed by cooling and contraction thereof, to effect snapping of the vane between its two positions to operate said contacts.

7. A snap action electric switch comprising, in combination, a substantially flat vane of electrically conductive resilient material having a substantially linear preset deformation extending thereacross, said deformation being interrupted intermediate its ends at points substantially equidistant from the vane center to leave the central area of the vane free of preset deformation and with curvilinear stress concentral loci concentric with the vane center, an electrically conductive member mounting said vane at a point on one of said loci spaced laterally from said deformation whereby, under bending stresses periodically applied to and released from points adjacent the outer ends of said deformation to effect snapping of the vane between a bending-stress-deformed position and a restored initial preset position, the free portion of the vane will pivot about such mounting point; a heat expansible element having its opposite ends secured to said vane at points adjacent the outer ends of said deformation and, in its cool and contracted condition, holding said vane in the stress-deformed condition in which the vane is bent about a line intersecting said deformation at an angle of substantially 90°; a first contact carried by the free portion of the vane; a second contact mounted on said member in insulated relation thereto; said contacts being engaged in one position of the free portion of the vane and disengaged in the other position thereof; a high resistance electric conductor arranged in heat transfer relation to said element; and means, including said contacts, said vane, and said member, operable to connect a source of electric potential across said conductor at intermittent intervals to heat and expand said element, followed by cooling and contraction thereof, to effect snapping of the vane between its two positions to operate said contacts.

8. A snap action electric switch comprising, in combination, a substantially flat vane of electrically conductive resilient material having a substantially linear preset deformation extending thereacross, said deformation being interrupted intermediate its ends at points substantially equidistant from the vane center to leave the central area of the vane free of preset deformation and with curvilinear stress concentration loci concentric with the vane center; an electrically conductive member electrically and mechanically secured to and mounting said vane at a point on one of said loci spaced laterally from said deformation on one surface thereof whereby, under bending stresses periodically applied to and released from points adjacent the outer ends of said deformation to effect snapping of the vane between a bending-stress-deformed position and a restored initial preset position the free portion of the vane will pivot about such mounting point; a heat expansible electrically conductive element having its oposite ends secured to said vane at points adjacent the outer ends of said deformation and, in its cool and contracted condition, holding said vane in the stress-deformed condition in which the vane is bent about a line intersecting said deformation at an angle of substantially 90°, said element, in the stress-deformed condition of the vane, having at least its intermediate portion spaced from said one surface of the latter; a first contact electrically and mechanically secured to the outer surface of the intermediate portion of said element; a second contact mounted on said member in insulated relation thereto; said contacts being engaged in the stress-deformed position of the free portion of the vane and disengaged in the restored position thereof; a high resistance electric conductor arranged in heat transfer relation to said element with one end connected to said second contact, and having a length and resultant resistance value independent of the length of said element; and means for applying a source of electric potential between said member and the other end of said conductor to heat said element to expand the same for snapping of the vane to the restored position to disengage said contacts, followed by cooling and contraction of said element to snap the vane to the stress-deformed position to re-engage said contacts.

9. A snap action electric switch comprising, in combination, a substantially flat and rectangular vane of electrically conductive resilient material having a substantially linear preset deformation extending thereacross along a diagonal, said deformation being interrupted intermediate its ends at points substantially equidistant from the vane center to leave the central area of the vane free of preset deformation and with curvilinear stress concentration loci concentric with the vane center; an electrically conductive member mounting said vane at a point on one of said loci spaced laterally from said deformation on one surface thereof whereby, under bending stresses periodically applied to and released from points adjacent the outer ends of said deformation to effect snapping of the vane between a bending-stress-deformed position and a restored initial preset position the free portion of the vane will pivot about such mounting point; a heat expansible electrically conductive element having its opposite ends secured to said vane at points adjacent the outer ends of said deformation and, in its cool and contracted condition, holding said vane in the stress-deformed condition in which the vane is bent about a line intersecting said deformation at an angle of substantially 90°, said element, in the stress-deformed condition of the vane, having at least its intermediate portion spaced from said one surface of the latter; a first contact mounted on the outer surface of the intermediate portion of said element; a second contact mounted on said member in insulated relation thereto; said contacts being engaged in a stress-deformed position of the free portion of the vane and disengaged in the restored position thereof; a high resistance electric conductor arranged in heat transfer relation to said element with one end connected to said second contact, and having a length and resultant resistance value independent of the length of said element; and means for applying a source of electric potential between said member and the other end of said conductor to heat said element to expand the same for snapping of the vane to the restored position to disengage said contacts, followed by cooling and contraction of said element to snap the vane to the stress-deformed position to re-engage said contacts.

10. A snap action electric switch comprising, in combination, a substantially flat vane of electrically conductive resilient material having a substantially linear preset deformation extending thereacross, said deformation being interrupted intermediate its ends at points substantially equidistant from the vane center to leave the central area of the vane free of preset deformation; an electrically conductive member mounting said vane at a point spaced laterally from said deformation on one surface thereof whereby, under bending stresses periodically applied to and released from points adjacent the outer ends of said deformation to effect snapping of the vane between a bending-stress-deformed position and a restored initial preset position the free portion of the vane will pivot about such mounting point, a heat expansible element having its opposite ends secured to said vane at points adjacent the outer ends of said deformation and, in its cool and contracted condition, holding said vane in the stress-deformed condition in which the vane is bent about a line intersecting said deformation at an angle of substantially 90°, said element, in the stress-deformed condition of the vane, having at least its intermediate portion spaced from the opposite surface of said vane and, in the restored position of the vane, lying along the opposite surface of the latter; a first contact carried by the free portion of the vane on said one surface thereof at a point on one of said loci on the opposite side of said deformation from such mounting point, a second contact mounted on said member in insulated relation thereto; said contacts being engaged in restored position of the free portion of the vane and disengaged in the stress-deformed position thereof; a high resistance electric conductor arranged in heat transfer relation to said element with one end connected to said second contact and the other end connected to said vane, and having a length and resultant resistance value independent of the length of said element; and means for applying a source of electric potential between said member and said second contact to heat said element to expand the same to engage said contacts to shunt said conductor, followed by cooling and contraction of said element to snap the vane to the stress-deformed position to disengage said contacts.

11. A snap action electric switch comprising, in combination, a substantially flat and rectangular vane of electrically conductive resilient material having a substantially linear preset deformation extending thereacross along a diagonal said deformation being interrupted intermediate its ends at points substantially equidistant from the vane center to leave the central area of the vane free of preset deformation and with curvilinear stress concentration loci concentric with the vane center; an electrically conductive member mounting said vane at a point on one of said loci spaced laterally from said deformation on one surface thereof whereby, under bending stresses periodically applied to and released from points adjacent the outer ends of said deformation to effect snapping of the vane between a bending-stress-deformed position and a restored initial preset position the free portion of the vane will pivot about such mounting point; a heat expansible element having its opposite ends secured to said vane at points adjacent the outer ends of said deformation and, in its cool and contracted condition, holding said vane in the stress-deformed condition in which the vane is bent about a line intersecting said deformation at an angle of substantially 90°, said element, in the stress deformed condition of the vane, having at least its intermediate portion spaced from the opposite surface of said vane and, in the restored position of the vane, lying along the opposite surface of the latter; a first contact carried by the free portion of the vane on said one surface thereof at a point on one of said loci on the opposite side of said deformation from such mounting point; a second contact mounted on said member in insulated relation thereto; said contacts being engaged in a restored position of the free portion of the vane and disengaged in the stress-deformed position thereof; a high resistance electric conductor arranged in heat transfer relation to said element with one end connected to said second contact and the other end connected to said vane, and having a length and resultant resistance value independent of the length of said element; and means for applying a source of electric potential between said member and said second contact to heat said element to expand the same to engage said contacts to shunt said conductor, followed by cooling and contraction of said element to snap the vane to the stress-deformed position to disengage said contacts.

12. A snap action electric switch as claimed in claim 1 in which said element is a channel and said conductor is insulated and disposed in said channel.

13. A snap action electric switch as claimed in claim 1 in which said conductor is insulated and said element comprises two superposed strips secured together and enclosing said conductor.

14. A snap action electric switch as claimed in claim 1 in which said element is a wire with an insulating sleeve thereon and said conductor is wound on said sleeve.

References Cited in the file of this patent
UNITED STATES PATENTS

| | | |
|---|---|---|
| 2,308,522 | Leuthold | Jan. 19, 1943 |
| 2,537,485 | Sitzer et al. | Jan. 9, 1951 |